United States Patent [19]

Beuscher

[11] 4,037,091
[45] July 19, 1977

[54] ERROR CORRECTION CIRCUIT UTILIZING MULTIPLE PARITY BITS

[75] Inventor: Hugo Jacob Beuscher, Glen Ellyn, Ill.

[73] Assignee: Bell Telephone Laboratories, Incorporated, Murray Hill, N.J.

[21] Appl. No.: 673,464

[22] Filed: Apr. 5, 1976

[51] Int. Cl.² .................... G06F 11/10; G11C 29/00
[52] U.S. Cl. ............................................. 235/153 AM
[58] Field of Search .............................. 235/153 AM; 340/146.1 BA

[56] References Cited

U.S. PATENT DOCUMENTS

| | | | |
|---|---|---|---|
| 3,665,393 | 5/1972 | Brune et al. | 340/146.1 BA |
| 3,768,071 | 10/1973 | Knauft et al. | 235/153 AM |
| 3,972,033 | 7/1976 | Cislaghi et al. | 235/153 AM |

Primary Examiner—Charles E. Atkinson
Attorney, Agent, or Firm—John C. Albrecht

[57] ABSTRACT

An arrangement for correcting errors in words read from a memory due to a bit in a word location of the memory being stuck in one of the two binary states, 0 or 1. The arrangement is used in cooperation with parity error detection arrangements which utilize more than one parity bit per word. Upon detection of a single parity failure in a word read from a selected word location in memory the complement of the data word which is indicated to contain a parity failure is placed in the selected word location; the memory is read at the selected word location and the data so obtained is placed back into the selected word location of the memory. After this step the data in the selected word location of memory comprises the complement of the correct data word and the parity bits are all the complement of the correct parity for that data word. The correct data word for use by the processor is thus generated by complementing this later received data. On subsequent reading of the memory at a previously failed location the corrected word in the location is recognized as such by a failure of all of the parity bits. A word in which all of the parity bits fail is automatically complemented and the result is utilized in the data processor.

13 Claims, 10 Drawing Figures

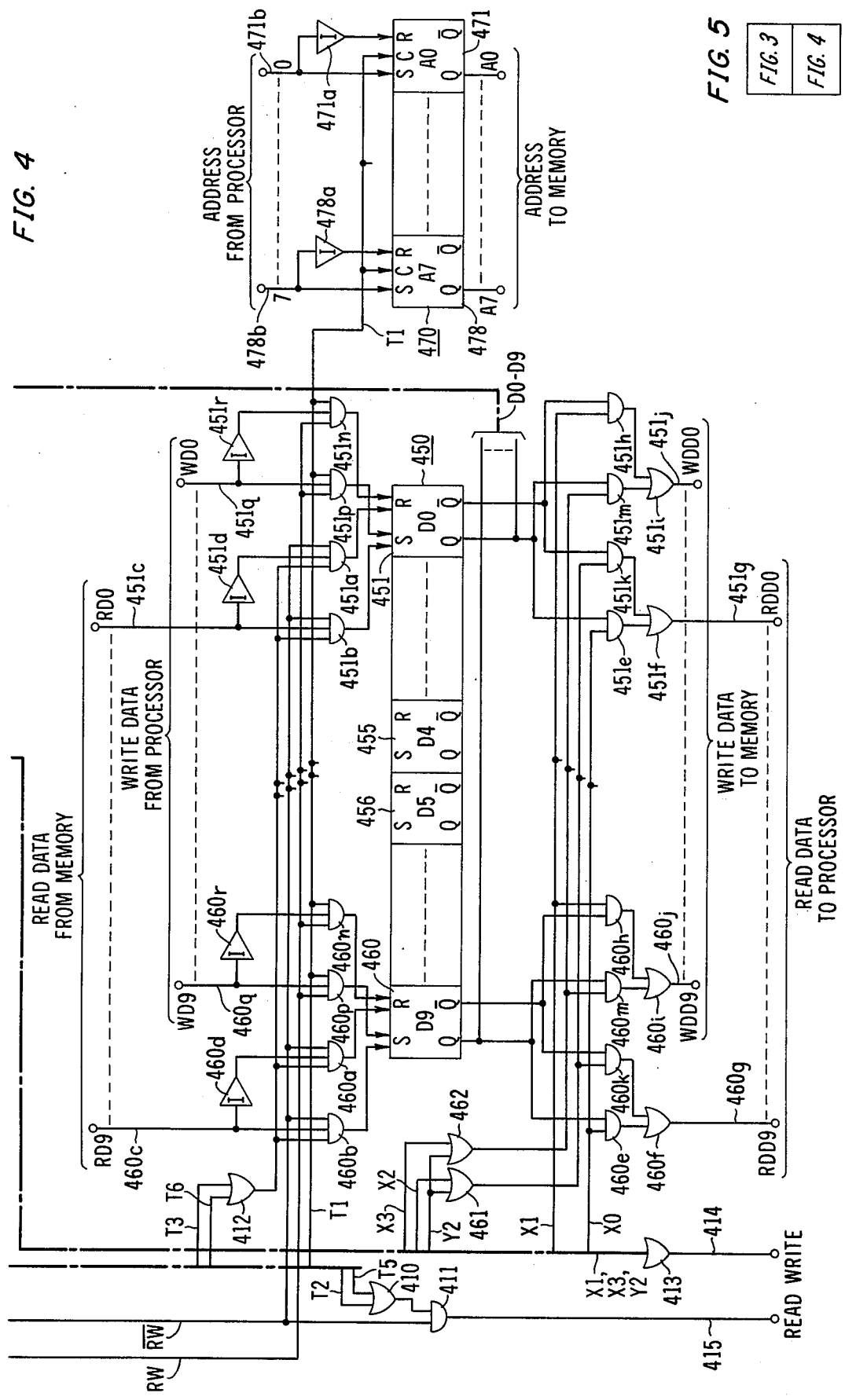

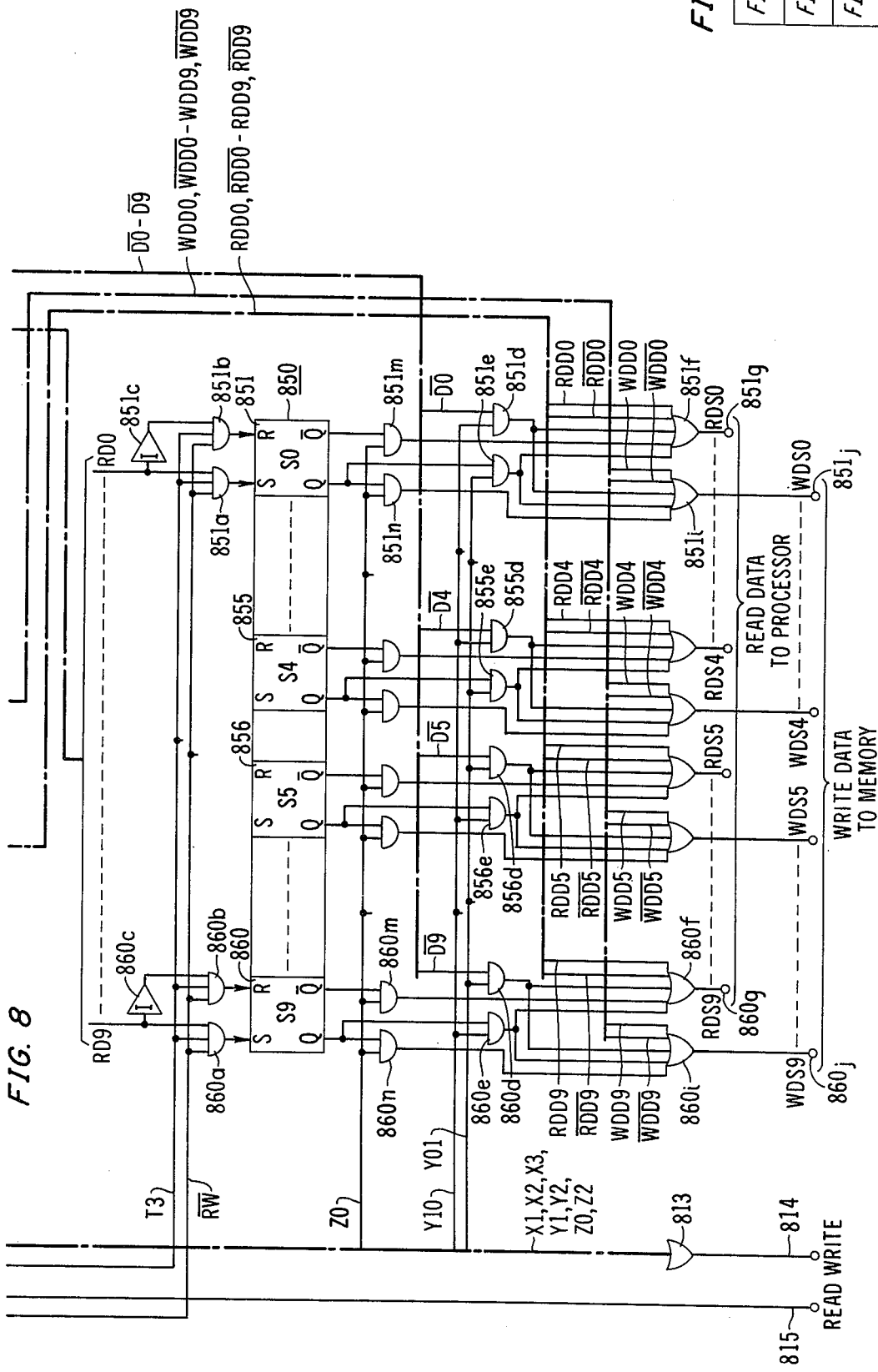

ERROR CORRECTION CIRCUIT UTILIZING MULTIPLE PARITY BITS

BACKGROUND OF THE INVENTION

This invention relates to memory systems and particularly to error correction in such systems and includes both method and apparatus inventions.

The reliability of information read from a memory can be increased by the use of error detection and correction circuits. One method for error detection and correction is the use of redundant bits in each data word. One commonly used error detection arrangement utilizes one or more parity bits each of which indicates whether there is an even or odd number of ones in the data bits associated with that parity bit.

In general, error correction requires more redundant bits than error detection. For example, while a parity check scheme can detect any single bit error it is not capable of error correction in the general case.

It is an object of this invention to provide an error correction method which will correct memory failures due to a predominant mode of failure; namely, a single bit stuck at one or zero.

SUMMARY OF THE INVENTION

In accordance with the present invention a method for correcting errors in a memory and applying the corrected words to a destination circuit is practiced in an error correction circuit arrangement comprising a memory with a plurality of data bits and a plurality of parity bits, read and write circuitry for the memory, parity check circuitry, complementing circuitry and output circuitry for transmitting corrected words to a destination circuit. The memory is read a first time and if one but not all of the parity bits are bad the word is complemented, written back into the same location and read a second time. If all of the parity bits of the second read word are bad then the second read word is complemented and gated to the destination circuit. If all of the parity bits of the first read word are bad, such as would be the case for previously corrected words, the first read word is complemented and gated to the destination circuit.

BRIEF DESCRIPTION OF THE DRAWING

An error correction circuit according to this invention will be better understood from a consideration of the detailed description of the organization and operation of one illustrative embodiment thereof which follows when taken in conjunction with the accompanying drawing in which:

FIGS. 3, 4 and 5 depict an exemplary memory error correction circuit for correcting single errors; and FIGS. 6, 7, 8, and 9 depict an exemplary error correction circuit according to this invention for correcting certain double errors.

DETAILED DESCRIPTION

I. INTRODUCTION

Figure 1A:
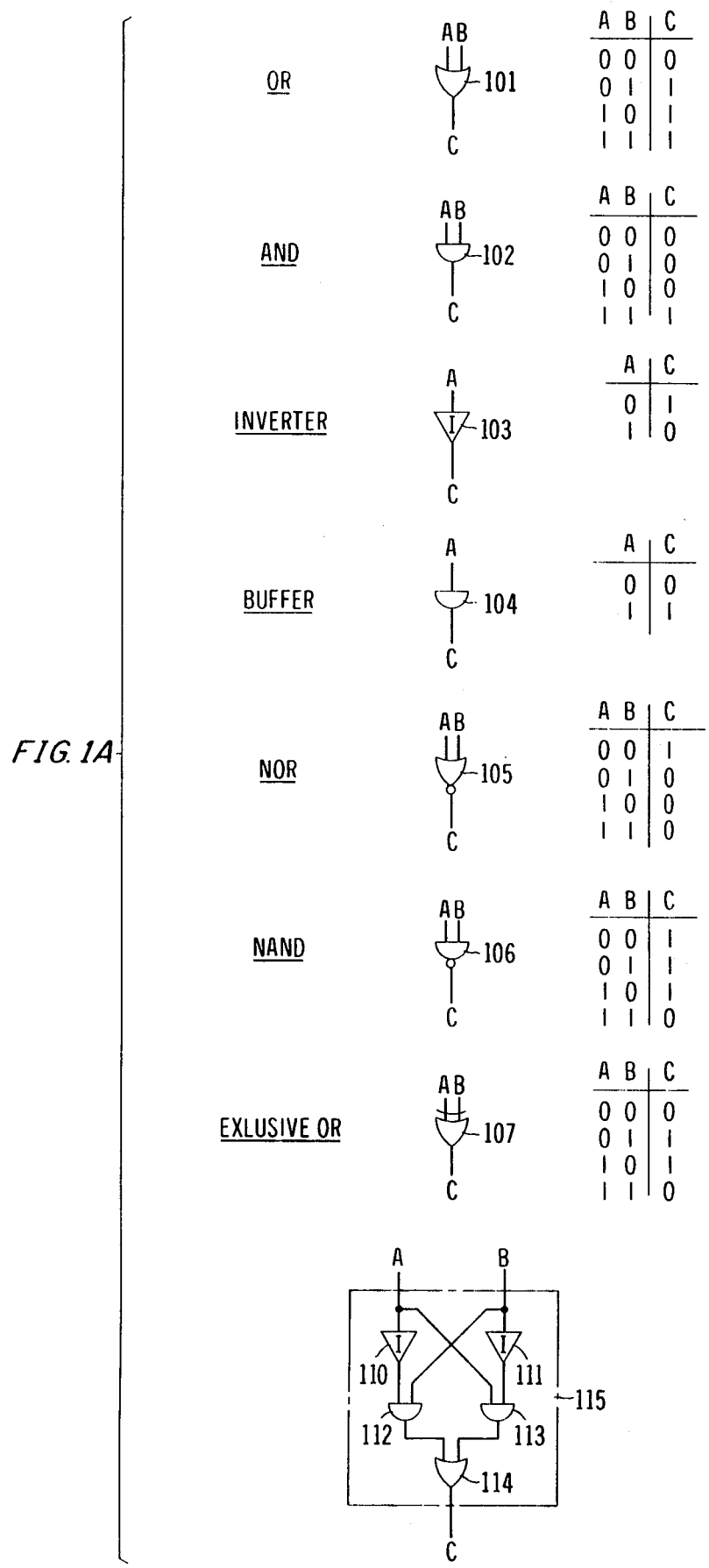
FIG. 1a depicts combinational circuit elements utilized in the drawing.
Figure 1B:
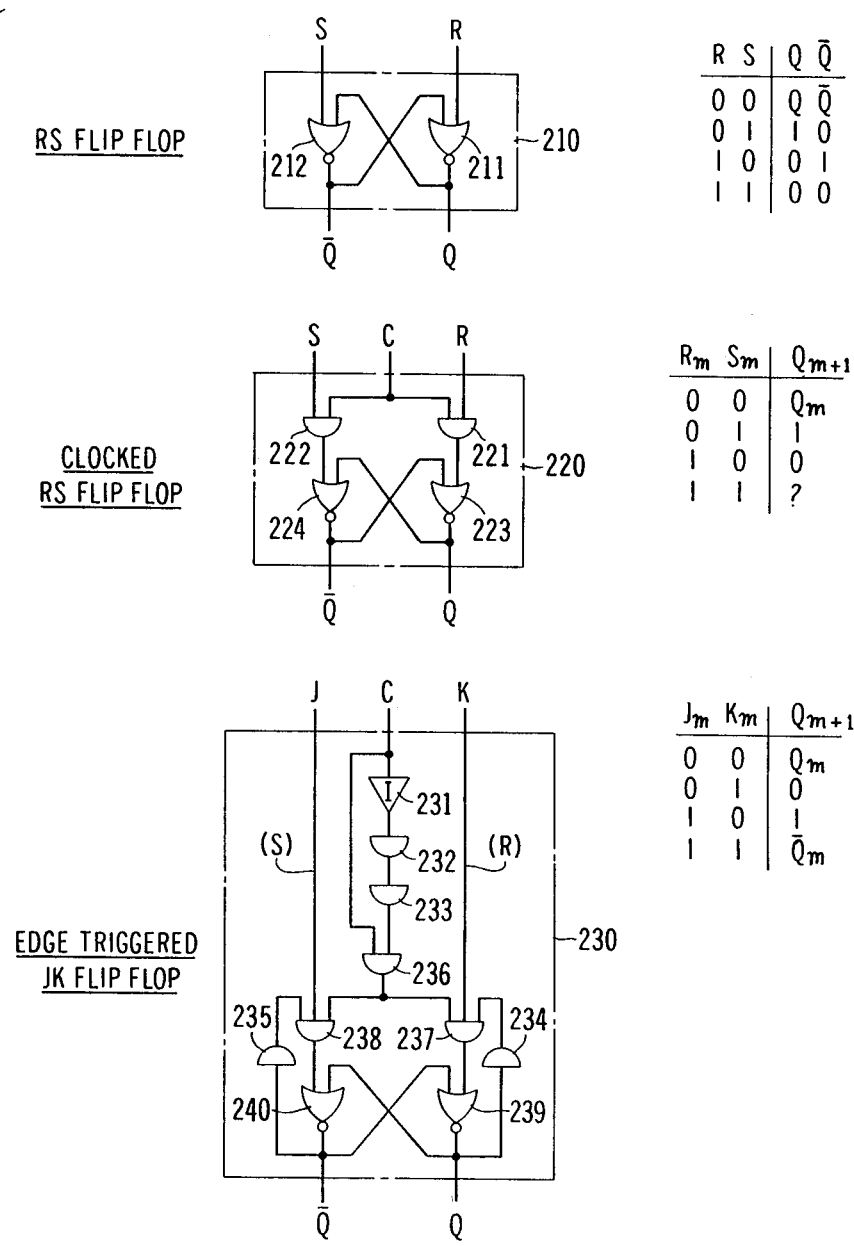
FIG. 1b depicts sequential circuit elements utilized in the drawing.

Memory error correction circuits according to the invention as shown in FIGS. 3 through 9 are constructed of elements which are defined in FIGS. 1a and 1b. The logic elements shown in FIGS. 1a and 1b are defined in the binary system in which each point in a circuit may be at one of the two values, 0 and 1. Each logic element is defined by showing the symbol used to represent it and a truth table which defines the output or outputs of the logical element for each combination of input states.

Each logic element has a time delay between the application of a certain set of inputs and the generation of the corresponding output at the logic element output terminal. Complex logic elements which are constructed from a number of simple logic elements have time delays corresponding to the number of simple logic elements connected between the input terminals and the output terminals of the complex logic element. All of the logic elements shown in FIGS. 1a and 1b are well known in the art of digital circuit design.

A. COMBINATIONAL LOGIC ELEMENTS

The combinational logic elements used in subsequent figures are shown in FIG. 1a. A combinational logic element is one whose outputs are a function only of the inputs at the present time. An OR gate 101, an AND gate 102, and an inverter 103 are defined by the associated truth tables. A buffer gate 104 as defined by its truth table simply transmits the signal present on its input to its output terminal delayed by the time delay of a simple logic element. A NOR gate 105 may be constructed from an OR gate followed by an inverter gate and a NAND gate 106 may be constructed from an AND gate followed by an inverter gate. An exclusive OR element 107 as defined by the associated truth table may be constructed from a combination of logic elements 110, 111, 112, 113, and 114 connected in the circuit 115. An exclusive OR element may be used to compare two input signals for equality.

B. SEQUENTIAL CIRCUIT ELEMENTS

The logic elements shown in FIG. 1b are sequential circuits, i.e., their outputs at a certain time are a function of their inputs at that time as well as their outputs at a prior time. Each of the logic elements 210, 220, and 230 is a flip-flop or memory element which may be put in one of two states and will remain in that state until changed to another state by a subsequent input. Flip-flop 210 is called an RS flip-flop in the prior art, where R stands for reset and S for set.

An RS flip-flop may be constructed from two NOR gates 211 and 212 connected in the circuit 210. If both R and S inputs are in the 0 state then the RS flip-flop outputs remain in whatever state they were in previously. If the S input to a 1 state and Q output also goes to a 1 state, i.e., it is set. If the R input goes to a 1 the Q output goes to a 0, i.e., it is reset. If both R and S inputs are in the 1 state then both Q and $\overline{Q}$ outputs are 0. The R and S inputs both in the 1 state is a bad state which is avoided.

A clocked RS flip-flop 220 may be constructed from two AND gates 221 amd 222 amd two NOR gates 223 and 224 connected according to the circuit 220. A clocked RS flip-flop operates the same as an RS flip-flop except that the R and S inputs only affect the state of the flip-flop outputs when the clock input C is in the 1 state. Again the input condition where both R and S are equal to 1 is a bad state which generates an undefined output.

An edge-triggered JK flip-flop 230 may be constructed from an inverter gate 231, buffer gates 232, 233, 234, and 235, AND gates 236, 237, and 238, and NOR gates 239 and 240 connected according to the circuit 230. An edge-triggered JK flip-flop differs from a clocked RS flip-flop in the following two principle ways. The output state of the flip-flop is sensitive to inputs J and K only for a very short period of time after the clock input C becomes a one. The J and K inputs correspond to inputs R and S respectively but are relabeled for clarity. Also, if both J and K inputs are in the one state the output is defined as the complement of the output during the previous clock period. In the art it is common to connect the J and K inputs together and relabel them T for toggle since a one signal applied to the T input will complement or toggle the output of the flip-flop.

II. SINGLE ERROR CORRECTION CIRCUIT

Figure 2:
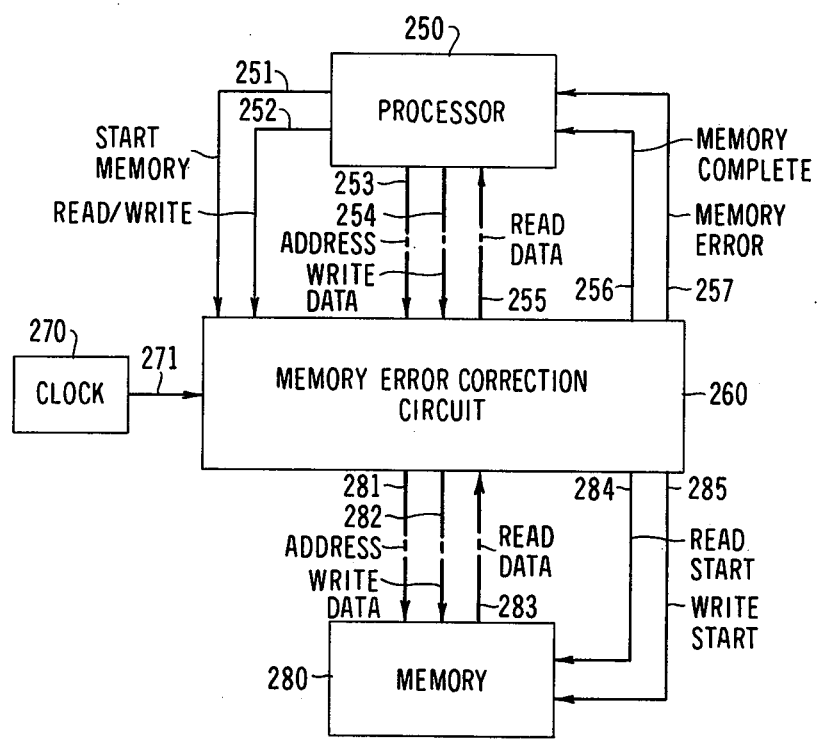
FIG. 2 depicts a block diagram of a processor, memory and memory error correction circuit.

An examplary application of a memory error correction circuit is shown in FIG. 2. The processor 250 is shown as an example of a destination circuit. However, any circuit which utilizes a memory may be inserted in place of the processor 250. The processor 250 is connected to the memory error correction circuit 260 by a number of signal transmission paths which provide the necessary transfer of data and control information between processor 250 and memory error correction circuit 260. The start memory control path 251 transfers a signal from the processor 250 to the memory error correction circuit 260 indicating the beginning of a memory operation. The read/write transmission path 252 transfers a signal from processor 250 to memory error correction circuit 260 which signal indicates whether the memory operation is a read or a write. The address transmission path 253 transfers a memory address from processor 250 to memory error correction circuit 260. The write data transmission path 254 transfers the data to be written into memory 280 for a write operation from the processor 250 to the memory error correction circuit 260. The read data transmission path 255 transfers data as a result of a read operation from memory error correction circuit 260 to processor 250. The memory complete transmission path 256 transfers a signal from memory error correction circuit 260 to processor 250 indicating that a memory operation has been completed. Memory error transmission path 257 transfers a signal from memory error correction circuit 260 to processor 250 indicating that a memory operation has terminated with an uncorrectable error.

The clock 270 generates a clock signal which is transferred to memory error correction circuit 260 over transmission path 271 and functions to advance the state of the memory error correction circuit 260. The memory 280 is connected to the memory error correction circuit 260 by means of a number of transmission paths. Address transmission path 281 transfers the memory address of the current memory operation from memory error correction circuit 260 to the memory 280. Write data transmission path 282 transfers data to be written into memory 280 from memory error correction circuit 260 to the memory 280. Read data transmission path 283 transfers data read from the memory 280 to the memory error correction circuit 260. Read start transmission path 284 transfers a signal from memory error correction circuit 260 to the memory 280 indicating the beginning of a memory read operation. Write start transmission path 285 transfers a signal from memory error correction circuit 260 to the memory 280 indicating the initialization of a memory write operation.

A. CIRCUIT STRUCTURE

Figure 3:
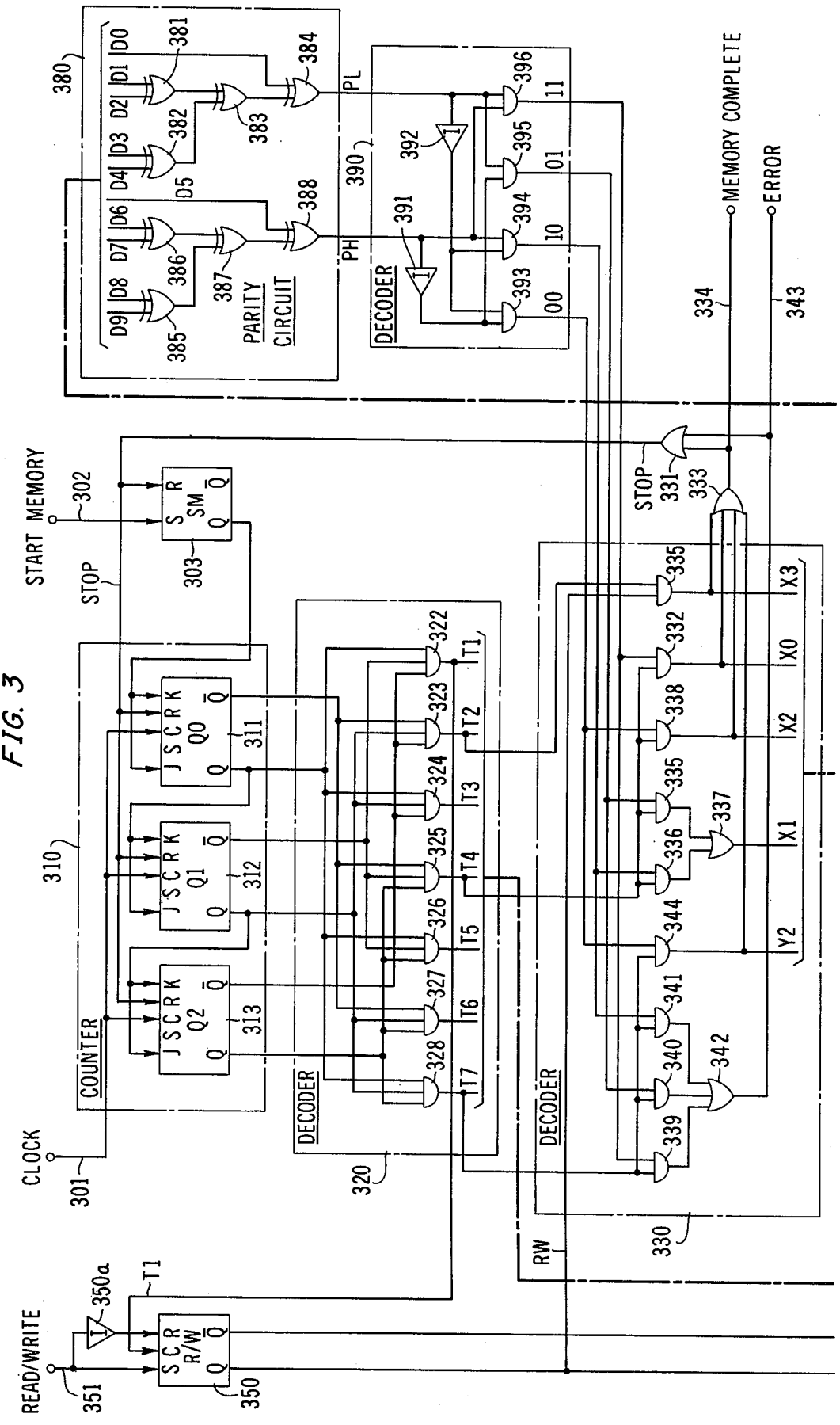

An error correcting circuit for correcting single errors in a data word having a plurality of parity bits according to this invention is shown in FIGS. 3 and 4 wherein the error correcting circuit shown is connected to a digital computer comprising the processor 250 and the memory 280 shown in FIG. 2. The processor 250 will receive the correct memory word, if the received word is correct or is correctable. The error correction circuit operating according to the principles of this invention proceeds sequentially through a number of steps or states and in certain cases goes to one of several subsequent states depending on data conditions in the circuit.

The circuit shown in FIGS. 3 and 4 is a synchronous sequential circuit, i.e., it changes from one state to another only at certain discrete intervals which are determined by an external clock signal (from clock 270 of FIG. 2) applied to input terminal 301. The counter circuit 310 performs the function of defining the current state of the error correction circuit as well as changing to the next state. Counter 310 comprises JK flip-flops 311, 312, and 313 which are connected as cascaded toggle flip-flops in order to form a binary counter.

The processor 250 initiates a memory operation by generating a start memory signal at terminal 302 which sets the RS flip-flop 303. As long as the start memory flip-flop 303 is set, i.e., has a 1 on its Q output, the binary counter formed by flip-flops 311, 312, and 313 will increment by one every time a clock signal pulse is received at terminal 301.

The outputs of counter 310 are in binary form and in order to obtain decoded signals suitable for use as control signals it is necessary to use the decoder 320. Decoder 320 comprises seven AND gates 322 through 328 whose inputs are connected to the outputs of flip-flops 311, 312, and 313 such that one and only one of the decoder gates 322 through 328 has a 1 output at any given time. The outputs $T_1$ through $T_7$ of decoder gates 322 through 328 are used to enable or control certain functions which are performed during the corresponding state.

The decoder 330 is used to generate control signals when data present in the circuit meets certain conditions during certain states. These control signals are used to enable gating paths into and out of the register 450, which register holds data read from the memory 280 or data to be written into the memory 280. The D register 450 comprises ten RS flip-flops 451 through 460 organized in two sections each comprising four data bits and one odd parity bit. Flip-flops 452 through 455, for example, contain four data bits and flip-flop 451 contains an odd parity bit which is in a 1 state if flip-flops 452 through 455 comprise an even number of 1 states and which is in a 0 state if flip-flips 452 through 455 comprise an odd number of 1 states. Flip-flop 456 is an odd parity flip-flop for data bits 457 through 460.

The register 470 comprising eight RS flip-flops 471 through 478 contains the address of a memory word, which address is received from the processor 250 and transmitted to the memory 280 in order to inform the memory 280 as to which word it is to perform an operation upon.

The parity circuit 380 performs the function of determining whether the contents of the D register 450 have correct parity bits or not. A word received from memory 280 and placed in the D register 450 may have one or both parity bits 451 and 456 bad if there has been an error either in the memory 280 or the transmission path from the memory 280 to the D register 450. Parity is checked on each half of the D register 450 independent of the other half. Exclusive OR gates 381 through 384 are connected as shown in FIG. 3 such that the output of exclusive OR gate 384 is a 0 if parity bit 451 is bad and is a 1 if parity bit 451 is good. Exclusive OR gates 385 through 388 perform the corresponding function for data bits 457 through 460 and parity bit 456 of the D register 450. Since it is necessary to perform different operations for the different possible combinations of good and bad parity bits 451 and 456 the decoder circuit 390 generates four decoded output signals corresponding to the four possible combinations of good and bad parity bits. Inverter gates 391 and 392 and AND gates 393 through 396 are connected according to the circuit shown in FIG. 3, such that the output of AND gate 393 is a 1 if both parity bits are bad, the output of AND gate 394 is a 1 if parity bit 456 is good but parity bit 451 is bad, the output of AND gate 395 is a 1 if parity bit 456 is bad and parity bit 451 is good and the output of AND gate 396 is a 1 if both parity bits are good.

B. READ OPERATION

The remaining circuit details will be best understood by a consideration of their functions in an exemplary single error correction read operation. Before a read operation is initiated the circuit must be in the stopped state, $T_0$, i.e., flip-flops 311, 312, and 313 are all in the 0 state, as the result of the completion of the previous store operation. Stop gate 331 is activated by one of a number of signals indicating the completion of certain sequences of operations. Stop gate 331 resets start memory flip-flop 303 and also resets each of the three flip-flops 311, 312, and 313 of counter 310 thereby forcing counter 310 to state $T_0$. Since the Q output of flip-flop 303 is in a 0 state, subsequent clock inputs at terminal 301 will have no effect upon counter 310.

A read operation is initiated by the receipt of a start memory signal on terminal 302 from the processor 250. The start memory signal sets flip-flop 303 thereby allowing the clock signal present at terminal 301 to increment counter 310 on each subsequent clock pulse.

The next clock signal pulse at terminal 301 causes counter 310 to be incremented to state $T_1$ thereby activating, i.e., generating a 1 signal a terminal $T_1$ which is the output of gate 332. The $T_1$ signal is used to gate a read/write control signal present on terminal 351 from the processor 250 into R/W flip-flop 350 utilizing inverter gate 350a to generate the complement of the read/write control signal in order to perform the gating operation. The $T_1$ signal is also used to gate an 8-bit memory address signal from the processor 250 into the address register 470 which comprises flip-flops 471 through 478. Inverter gates 471a through 478a are used to generate the complement of the eight address bits in order to perform the input gating.

The next clock signal pulse received at terminal 301 causes counter 310 to go into state $T_2$ thereby activating gate 323 and generating a 1 signal at terminal $T_2$. Terminal $T_2$ is connected to an input of OR gate 410 whose output is a 1 since the output of gate 323 is a 1. The output of OR gate 410 is connected to an input of AND gate 411. A second input of AND gate 411 is connected to the complementary output of R/W flip-flop 350.

When a read operation is initiated, R/W flip-flop 350 is reset by the read/write signal on terminal 351 and its complementary output is in a 1 state. Since both inputs to gate 411 are 1s during state $T_2$ of a read operation, the output of gate 411 is a 1. The output of gate 411 is connected to read signal terminal 415 which is in turn connected to the memory 280. A 1 signal present on the output of gate 411 thereby initiates a memory read operation in the memory 280.

The next clock signal pulse received on terminal 301 causes counter 310 to be incremented and go into state $T_3$ thereby causing a 1 signal to be generated by gate 324 at terminal $T_3$. Terminal $T_3$ is connected to an input of OR gate 412 which therefore has a 1 present on its output. The output of OR gate 412 is connected to an input of each of AND gates 451a through 460a and 451b through 460b. A second input of each of AND gates 451a through 460a and 451b through 460b is connected to the complementary output of read/write flip-flop 350. A third input of each of AND gates 451b through 460b is connected to the corresponding read data input terminals 451c through 460c which are connected to the outputs of the memory 280. Inverter gates 451d through 460d each have an input connected to the corresponding read data inputs 451c through 460c and an output connected to a third input of corresponding gates 451a through 460a. The outputs of gates 451a through 460a are connected to the corresponding reset inputs of flip-flops 451 through 460 and the outputs of gates 451b through 460b are connected to the corresponding set inputs of flip-flops 451 through 460. During state $T_3$ of a read operation the output of gate 412 is a 1 and the complementary output of R/W flip-flop 350 is a 1and therefore the data present on read data input terminals 451c through 460c is gated into flip-flops 451 through 460.

The next clock signal pulse at terminal 301 causes counter 310 to be incremented to state $T_4$ thereby causing a 1 signal to be generated at terminal $T_4$ by gate 325. The data read from memory 280 into the D register 450 during state $T_3$ is now present on the respective outputs of flip-flops 451 through 460 which are connected to corresponding input terminals of parity circuit 380. The two output terminals PL and PH of parity circuit 380 indicate whether parity is good or bad for the two halves of register 450. The two parity circuit output terminals PL and PH are connected to respective inputs of decoder 390 whereby one of the four AND gates 393, 394, 395, and 396 has a 1 on its output while the others all have 0's on their outputs.

The output of AND gate 396 is connected to one input of AND gate 332, terminal $T_4$ is connected to a second input of AND gate 332 and the output of AND gate 332 is connected to terminal $X_0$. If both parity bits are good during state $T_4$ then the output of gate 396 is a 1 and terminal $T_4$ is a 1 whereby the output of AND gate 332 and terminal $X_0$ are also in a 1 state. Terminal $X_O$ is connected to a first input of each of AND gates 451e through 460e and the true output of flip-flops 451 through 460 are connected to a second input of AND gates 451e through 460e. The output of each of AND gates 451e through 460e is connected to one input of the corresponding OR gate 451f through 460f and the output of each of OR gates 451f through 460f is connected to the corresponding terminal 451g through 460g. Output terminals 451g through 460g are connected to the memory data input to the processor 250. The above circuitry functions to gate the contents of the D register 450 to the processor 250 if both parity bits are good during state $T_4$.

Terminal $X_0$ is also connected to an input of OR gate 333 and the output of OR gate 333 is connected to the memory complete terminals 334. The output of OR gate 333 is also connected to an input of Stop gates 331 whereby a memory complete signal is sent to the processor 250 and the counter 310 is initialized to state $T_O$ thereby inhibiting further counting.

A first input of each of AND gates 335 and 336 is connected to the output of AND gates 395 and 394 respectively and a second input of each of AND gates 335 and 336 is connected to terminal $T_4$. The outputs of AND gates 335 and 336 are connected to inputs of OR gate 337. The output of OR gate 337 is connected to terminal $X_1$ which is a 1 only if one parity bit is good and one parity bit is bad during state $T_4$. Terminal $X_1$ is connected to a first input of each of AND gates 451h through 460h. The complement output of flip-flops 451 through 460 are connected to the second inputs of corresponding AND gates 451h through 460h. The outputs of AND gates 451h through 460h are connected to corresponding inputs of OR gates 451i through 460i. The outputs of OR gates 451i through 460i are connected to corresponding write data terminals 451j through 460j. Output terminals 451j through 460j are connected to the corresponding write data input terminals of the memory 280. The above circuitry functions to gate the complemented contents of D register 450 to memory 280 is one and only one parity bit of D register 450 is bad during state $T_4$.

Terminal $X_1$ is also connected to an input of OR gate 413 thereby causing the output of OR gate 413 to be a 1 whenever terminal $X_1$ is a 1. The output of OR gate 413 is connected to a write terminal 414 which is in turn connected to the write control input of the memory 280. If one and only one parity bit of D register 450 is bad during state $T_4$ then a write control signal will be sent to the memory 280 along with the complemented contents of D register 450.

The output of AND gate 393 is connected to a first input of AND gate 338. A second input of AND gate 338 is connected to terminal $T_4$ whereby the output of AND gate 338 is a 1 only if both parity bits are bad during state $T_4$. The output of AND gate 338 is connected to terminal $X_2$. Terminal $X_2$ is connected to a first input of OR gate 461. AND gates 451k through 460k each have a first input connected to the output of OR gate 461, a second input connected to the corresponding complement output of flip-flops 451 through 460 and an output connected to the corresponding input of OR gates 451f through 460f whereby if both parity bits of D register 450 are bad during state $T_4$ the complement of the contents of D register 450 are gated to the memory data input of the processor 250 by means of read data terminals 451g through 460g. Terminal $X_2$ is also connected to an input of OR gate 333 whereby if both parity bits of D register 450 are bad during state $T_4$ the memory complete signal is sent to the processor 250, the counter 310 is reset to state $T_0$ and flip-flop 303 is reset to inhibit further counting.

The next clock signal pulse at terminal 301 causes counter 310 to be incremented to state $T_5$ if the counter was not stopped during state $T_4$. During state $T_5$ the output of AND gate 326 is in the 1 state. The output of AND gate 326 is connected to terminal $T_5$ which is connected to an input of OR gate 410 whereby a read control signal is sent to memory 280.

The next clock signal pulse at terminal 301 causes counter 310 to be incremented to state $T_6$ thereby causing the output of AND gate 327 to be in a 1 state. The output of AND gate 327 is connected to terminal $T_6$ which is connected to an input of OR gate 412 thereby causing the data from memory 280 present on terminals 451c through 460c to be gated into corresponding flip-flops 451 through 460 of D register 450.

The next clock signal pulse at terminal 301 causes counter 310 to be incremented to state $T_7$ thereby causing the output of AND gate 328 to be in a 1 state. The output of gate 328 is connected to terminal $T_7$ which is connected to a first input of AND gates 339, 340, and 341. A second input of AND gate 339 is connected to the output of AND gate 396, a second input of AND gate 340 is connected to the output of AND gate 395 and a second input of AND gate 341 is connected to the output of AND gate 394. The OR gate 342 comprises three inputs connected respectively to the outputs of AND gates 339, 340, and 341 and an output connected to an input of Stop OR gate 331 and error signal terminal 343. If, during state $T_7$, both parity bits are good or only one parity bit is bad the output of OR gate 342 becomes a 1 thereby sending an error signal to the processor 250 by means of error signal terminal 343, counter 310 is reset to state $T_0$ and flip-flop 303 is reset by means of Stop gate 331 to inhibit further incrementing of counter 310. An error signal sent to the processor 250 indicates that the error correction circuit has detected conditions indicative of an error which it is incapable of correcting.

The AND gate 344 has a first input connected to terminal $T_7$ and a second input connected to the output of gate 393 whereby the output of gate 344 becomes a 1 if both parity bits are bad during state $T_7$. The output of AND gate 344 is connected to terminal $Y_2$ which is connected to an input of OR gate 461 whereby if both parity bits are bad during state $T_7$ the complemented contents of the D register 450 are gated to the processor 250. Terminal $Y_2$ is also connected to an input of OR gate 462. The output of gate 462 is connected to a first input of each of AND gates 451m through 460m, the second inputs of gates 451m through 460m are connected to corresponding true outputs of flip-flops 451 through 460 and the output of AND gates 451m through 460m are connected to an input of corresponding gates 451i through 460i. If both parity bits are bad during stte $T_7$ the above circuitry functions to gate the contents of the D register 450 to the memory write data terminals 451j through 460j. Terminal $Y_2$ is also connected to an input of OR gate 333 whereby the memory complete signal is sent to the processor 250 through terminal 344 and a stop signal is generated for counter 310 by Stop gate 331. Since all possible conditions at state $T_7$ result in a stop signal thereby putting counter 310 in state $T_0$ subsequent clock signal pulses received on terminal 301 have no effect upon the system state until a start memory signal is received on terminal 302.

C. WRITE OPERATION

A write operation initiated by the processor 250 will now be described. No error correction functions are performed during a write operation from the processore 250, however, the write operation is described here in order to complete the description of the error correction circuit.

Again, assume that counter 310 is in state $T_0$ and a 1 signal is received on the start memory terminal from the processor 250. The next clock signal pulse at terminal 301 causes counter 310 to be incremented to state $T_1$ thereby causing a 1 signal to appear at terminal $T_1$. During state $T_1$ the signal present on read/write terminal 351 is gated into R/W flip-flop 350 and the 8-bit address present on address input terminals 471b through 478b is gated into address register 470. Since this is a write operation the signal present on read/write signal terminal 351 will be a 1 thereby setting R/W flip-flop 350.

Terminal $T_1$ is also connected to a first input of AND gates 451n through 460n and 451p through 460p. The true output of R/W flip-flop 350 is connected to a second input of AND gates 451n through 460n and 451p through 460p. The data to be written into memory 280 is provided by the processor 250 on terminals 451q through 460q, which terminals are connected to corresponding third inputs of gates 451p through 460p. Inverter gates 451r through 460r each comprise an input connected to corresponding write data input terminals 451q through 460q and an output connected to an input of corresponding AND gates 451n through 460n. The outputs of AND gates 451n through 460n are connected to corresponding reset inputs of flip-flops 451 through 460 and the outputs of AND gates 451p through 460p are connected to corresponding set inputs of flip-flops 451 through 460. The above circuitry functions to gate write data from the processor 250 to D register 450 during state $T_1$ of a write operation.

The next clock signal pulse at terminal 301 causes counter 310 to be incremented to state $T_2$ thereby causing a 1 signal to be present at teminal $T_2$. The output of AND gate 323 is connected to an input of AND gate 345 and the true output of R/W flip-flop 350 is connected to a second input of AND gate 345 whereby the output of AND gate 345 is a 1 during state $T_2$ of a write operation. The output of AND gate 345 is connected to terminal $X_3$ which is connected to an input of OR gate 462 whereby the contents of the D register 450 are gated to the memory write data terminals 451j through 460j. Terminal $X_3$ is also connected to an input of OR gate 413 whereby a write control signal is generated at the memory write terminal 414 during state $T_2$ of a write operation. Terminal $X_3$ is also connected to an input of OR gate 333 whereby a memory complete signal is sent to the processor 250 over memory complete terminal 334 and a stop signal is sent to counter 310 by means of Stop gate 331 thereby terminating the write operation.

D. STATE TABLE

The following table summarizes the states and operations performed during each state for both a read and a write operation of the Single Error Correction Circuit shown in FIGS. 3 and 4.

| STATE | READ (SINGLE ERROR CORRECTION) DESCRIPTION |
|---|---|
| $T_0$ | Stop. |
| $T_1$ | Load address register 470. |
| $T_2$ | Start read by sending a read control signal to memory 280 on terminal 415. |
| $T_3$ | Receive data from memory 280 and put in D register 450. |
| $T_4$ | If neither parity bit is bad gate the D register 450 to the processor on terminals 451g through 460g, gate a memory complete signal to the processor 250 on terminal 334 and stop. If one parity bit is bad write the contents of the D register 450 complemented into memory 280. If both parity bits are bad gate the complemented contents of the D register 450 to the processor 250 on terminals 451g through 460g, gate a memory complete signal to the processor 250 on terminal 334 and stop. |
| $T_5$ | Start read by sending a read control signal on terminal 415 to memory 280. |
| $T_6$ | Receive data from memory 280 and put in D register 450. |
| $T_7$ | If neither or only one parity bit is bad send an error signal to the processor 250 on terminal 343 and stop. If both parity bits are bad write the contents of the D register 450 into memory 280, gate the complemented contents of the D register 450 to the processor 250 on terminals 451g through 460g, gate a memory complete signal to the processor 250 on terminals 334 and stop. |

| STATE | WRITE DESCRIPTION |
|---|---|
| $T_0$ | Stop. |
| $T_1$ | Load the address register 470 with a memory address and the D register 450 with data to be written. |
| $T_2$ | Start write by sending a write control signal to the memory 280 on terminal 414, write data to the memory 280 on terminals 451j through 460j and stop. |

III. DOUBLE ERROR CORRECTION CIRCUIT

A. CIRCUIT STRUCTURE

Figure 6:
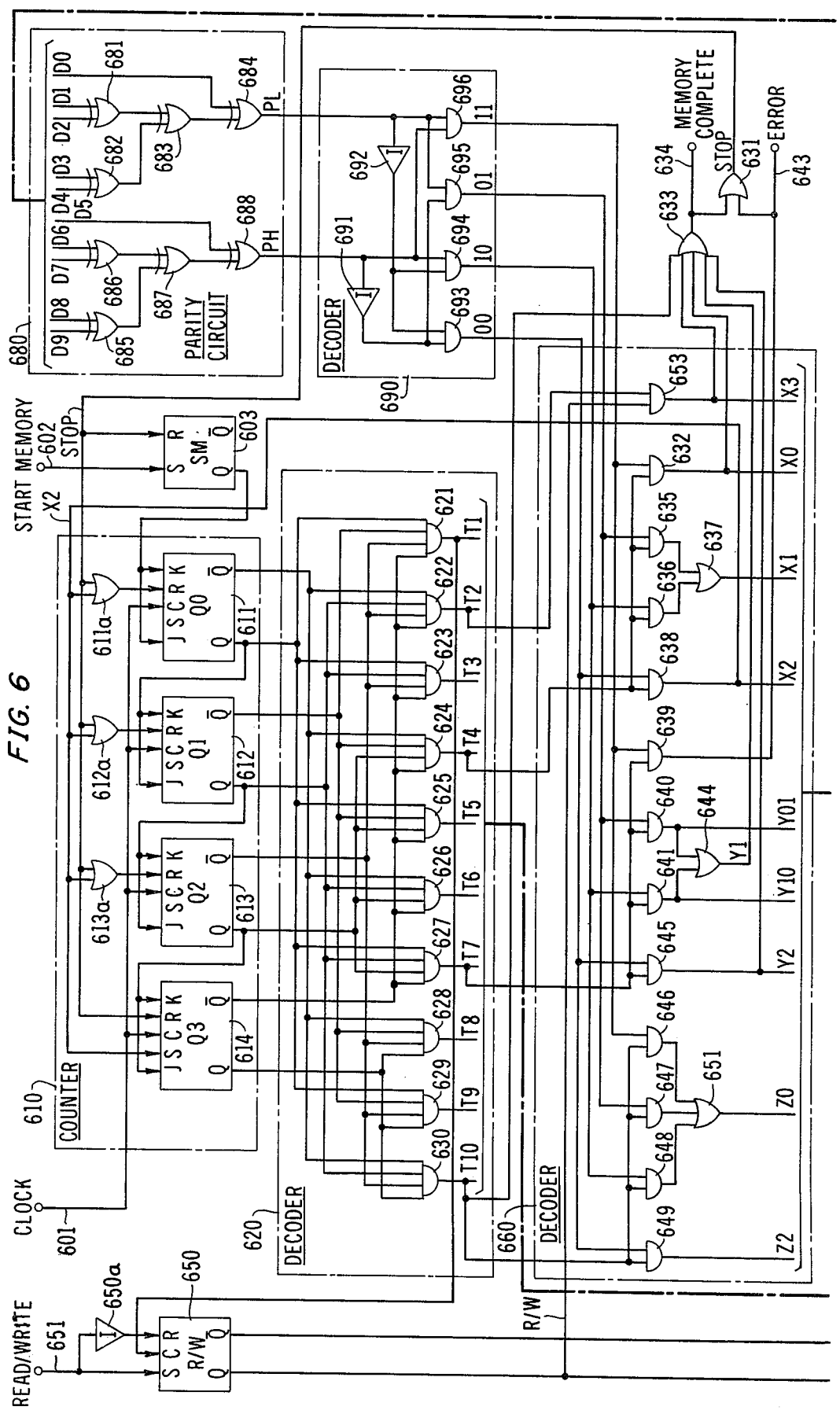
Figure 7:
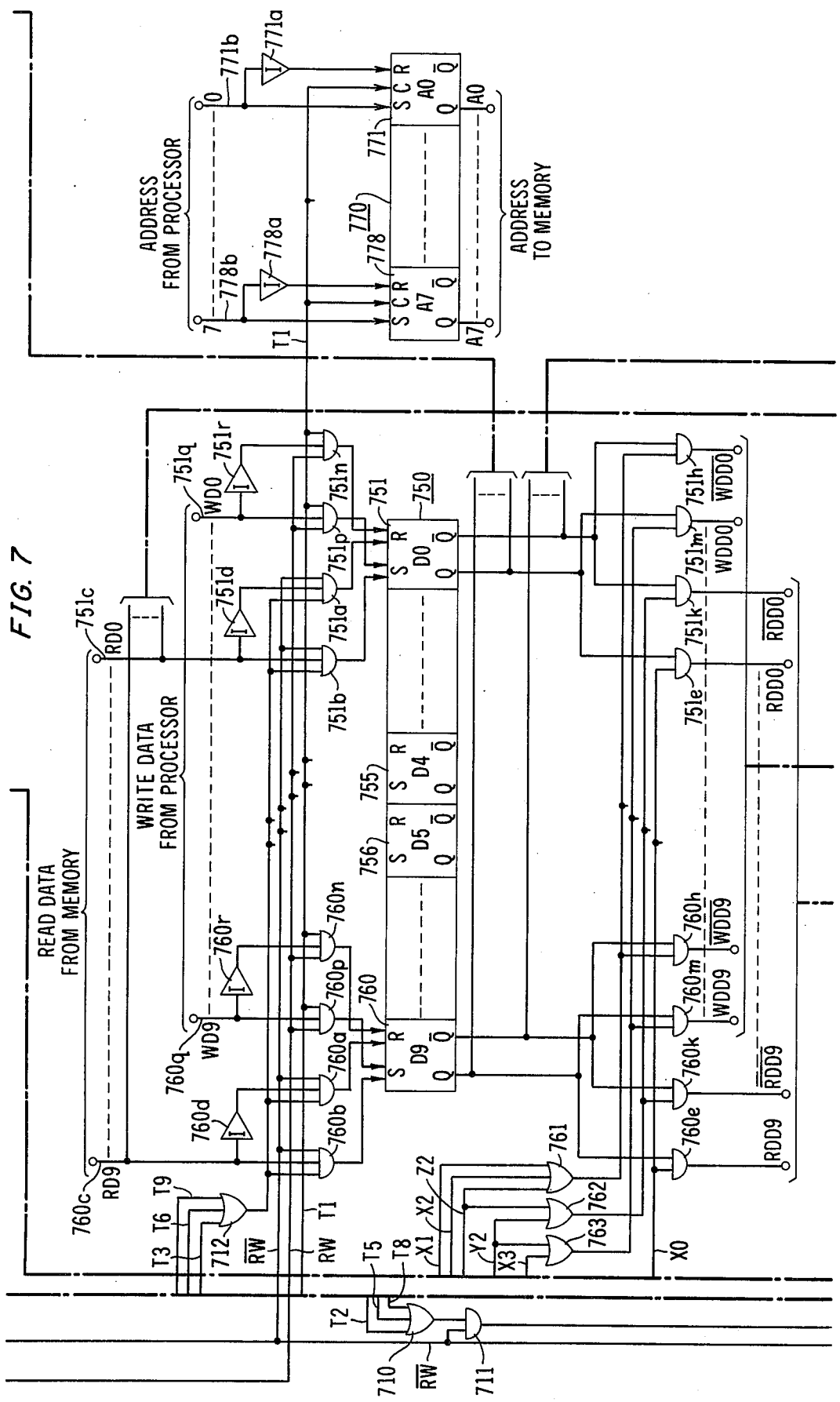

A circuit for correcting certain double errors during a memory read operation is shown in FIGS. 6, 7, and 8. The basic structure of the double error correction circuit is the same as the single error correction circuit shown in FIGS. 3 and 4. The double error correction circuit comprises an additional register for retaining the first read contents of memory 280 for possible later use as well as additional states and corresponding circuitry for implementing additional operations during those states.

The circuit shown in FIGS. 6, 7, and 8 is a synchronous sequential circuit driven by an external clock signal applied to input terminal 601. A counter circuit 610 determines the current state of the error correction circuit. Counter 610 comprises JK flip-flops 611, 612, 613, and 614 which are connected as cascaded toggle flip-flops in order to form a binary counter.

The processor generates a start memory signal at terminal 602 which sets an RS flip-flop 603 in order to start a memory operation. As long as the start memory flip-flop 603 is set, i.e., has a 1 on its Q output, the binary counter formed by flip-flops 611, 612, 613, and 614 will increment by one every time a clock signal pulse is received at terminal 601.

The outputs of counter 610 are in binary form and in order to obtain decoded signals suitable for use as control signals it is necessary to use the decoder 620. Decoder 620 comprises ten AND gates 621 through 630 with inputs connected to the outputs of flip-flops 611, 612, 613, and 614 such that one and only one of the decoder gates 621 through 630 has a 1 output at any given time. The outputs $T_1$ through $T_{10}$ of decoder gates 621 through 630 are used to enable or control certain functions which are performed during the corresponding state.

The decoder 660 is used to generate control signals when data present in the circuit meets certain conditions during certain states. These control signals are used to enable gating paths into and out of register 750, which register holds data read from the memory 280 or data to be written into the memory 280 or register 850, which holds the first read contents of memory 280 for later use while register 750 is used for other purposes. The D register 750 comprises ten RS flip-flops 751 through 760 organized in two sections each comprising four data bits and one odd parity bit. Flip-flops 752 through 755, for example, contain four data bits and flip-flop 751 contains an odd parity bit which is in a 1 state if flip-flops 752 through 755 comprise an even number of 1 states and which is in a 0 state if flip-flops 752 through 755 comprise an odd number of 1 states. Flip-flop 756 is an odd parity flip-flop for data bits 757 through 760. The S register 850 comprises ten RS flip-flops 851 through 860 organized in two sections, each comprising four data bits and one odd parity bit. The structure of the S register 850 is the same as the D register 750. Flip-flop 851 is an odd parity flip-flop for data bits 852 through 855 and flip-flop 856 is an odd parity flip-flop for data bits 857 through 860.

The register 770 comprising eight RS flip-flops 771 through 778 contains the address of a certain memory words, which address is received from the processor 250 and transmitted to the memory 280 in order to determine which word the memory 280 is to perform an operation upon.

The parity circuit 680 performs the function of determining whether the contents of the D register 750 have correct parity bits or not. A word received from memory 280 and placed in the D register 750 may have one or both parity bits 751 and 756 bad if there has been an error either in the memory 280 or the transmission path from the memory 280 to the D register 750. Parity is checked on each half of the D register 750 independent of the other half. Exclusive OR gates 681 through 684 are connected as shown in FIG. 6 such that the output of exclusive OR gate 684 is a 1 if parity bit 751 is incorrect and is a 0 if parity bit 751 is correct. Exclusive OR gates 685 through 688 perform the corresponding function for data bits 757 through 760 and parity bit 756 of the D register 750. Since it is necessary to perform different operations for the different possible combinations of good and bad parity bits, 751 and 756, a decoder circuit 690 generates four decoded output signals corresponding to the four possible combinations of good and bad parity bits. Inverter gates 691 and 692 and AND gates 693 through 696 are connected according to the circuit shown in FIG. 6, such that the output of AND gate 693 is a 1 if both parity bits are bad, the output of AND gate 694 is a 1 if parity bit 756 is good but parity bit 751 is bad, the output of AND gate 695 is a 1 if parity bit 756 is bad and parity bit 751 is good and the output of AND gate 696 is al 1 if both parity bits are good.

B. READ OPERATION

The remaining circuit details will be best undestood by a consideration of their functions in an exemplary double error correction read operation. Before a read operation is initiated the circuit must be in the stopped state, $T_0$, as the result of the completion of the previous store operation. Stop gate 631 is activated by one of a number of signals indicating the completion of certain sequences of operations. Stop gate 631 resets start memory flip-flop 603 and also resets each of the four flip-flops 611, 612, 613, and 614 of counter 610 thereby forcing counter 610 to state $T_0$. Since the Q output of flip-flop 603 is in a 0 state, subsequent clock inputs at terminal 601 will have no effect upon counter 610.

A read operation is initiated by the receipt of a start memory signal on terminal 602 from the processor 250. The start memory signal sets flip-flop 603 thereby allowing the clock signal present at terminal 601 to increment counter 610 on each subsequent clock pulse.

The next clock signal pulse at terminal 601 causes counter 610 to be incremented to state $T_1$ thereby activating, i.e., generating a 1 signal at terminal $T_1$ which is connected to the output of gate 621. The $T_1$ signal is used to gate a read/write control signal from the processor 250 into R/W flip-flop 650 utilizing inverter gate 650a to generate the complement of the read/write control signal in order to perform the gating operation. The $T_1$ signal is also used to gate an 8-bit memory address signal from the processor 250 into the address register 770 which comprises flip-flops 771 through 778. Inverter gates 771a through 778a are used to generate the complement of the eight address bits in order to perform the input gating.

The next clock signal pulse received at terminal 601 causes counter 610 to go into state $T_2$ thereby activating gate 622 and generating a 1 signal at terminal $T_2$. Terminal $T_2$ is connected to an input of OR gate 710 whose output is therefore a 1 during state $T_2$. The output of OR gate 710 is connected to an input of AND gate 711. A second input of AND gate 711 is connected to the complementary output of R/W flip-flop 650. When a read operation is initiated, R/W flip-flop 650 is reset by the read/write signal from the processor 250 and its complementary output is in a 1 state. Since both inputs to gate 711 are 1s during state $T_2$ of a read operation, the output of gate 711 is a 1. The output of gate 711 is conncted to read signal terminal 815 which is in turn connected to the memory 280. A 1 signal present on the output of gate 711 thereby initiates a memory read operation in the memory 280.

The next clock signal pulse received on terminal 601 causes counter 610 to be incremented and go into state $T_3$ thereby causing a 1 signal to be generated by gate 623 at terminal $T_3$. Terminal $T_3$ is connected to an input of OR gate 712 which therefore has a 1 present on its output. The output of OR gate 712 is connected to an input of each of AND gates 751a through 760a and 751b through 760b. A second input of each of AND gates 751a through 760a and 751b through 760b is connected to the complementary output of read/write flip-flop 650. A third input of each of ANd gates 751b through 760b is connected to the corresponding read data input terminals 751c through 760c which are connected to the outputs of the memory 280. Inverter gates 751d through 760d each have an input connected to the corresponding read data inputs 751c through 760c and an output connected to a third input of corresponding gates 751a through 760a. The outputs of gates 751a through 760a are connected to the corresponding reset inputs of flip-flops 751 through 760 and the outputs of gates 751b through 760b are connected to the corresponding set inputs of flip-flops 751 through 760. During state $T_3$ of a read operation the output of gate 712 is a 1 and the complementary output of R/W flip-flop 650 is a 1 and therefore the data present on read data input terminals 751c through 760c is gated into flip-flops 751 through 760. Terminal $T_3$ is also connected to an input of each of AND gates 851a through 860a and 851b through 860b. A second input of each of AND gates 851a through 860a is connected to a corresponding one of memory read data input terminals 751c through 760c. Inverter gates 851c through 860c each have an input connected to the corresponding memory read data input terminals 751c through 760c and an output connected to a second input of corresponding gates 851b through 860b. A third input of each of gates 851a through 860a and 851b through 860b is connected to the complementary output of R/W flip-flop 650. The outputs of gates 851a through 860a are connected to the corresponding set inputs of flip-flops 851 through 860 and the outputs of gates 851b through 860b are connected to the corresponding reset inputs of flip-flops 851 through 860. During state $T_3$ of a read operation the output of gate 623 is a 1 and the complementary output of R/W flip-flop 650 is a 1 and therefore the data present on memory read data input terminals 751c through 760c is gated into flip-flops 851 through 860.

The next clock signal pulse at terminal 601 causes counter 610 to be incremented to state $T_4$ thereby causing a 1 signal to be generated at terminal $T_4$ by gate 624. The data read from memory 280 into the D register 750 during state $T_3$ is now present on the respective outputs of flip-flops 751 through 760 which are connected to corresponding input terminals of parity circuit 680. The two output terminals PL and PH of parity circuit 680 indicate whether parity is good or bad for the two halves of register 750. The two parity circuit output terminals PL and PH are connected to respective inputs of decoder 690 whereby one of the four AND gates 693, 694, 695, or 696 has a 1 on its output while the others all have 0's on their outputs.

The output of AND gate 696 is connected to one input of AND gate 632, terminal $T_4$ is connected to a second input of AND gate 632 and the output of AND gate 632 is connected to terminal $X_0$. If both parity bits are good during state $T_4$ then the output of gate 696 is a 1 and terminal $T_4$ is a 1 whereby the output of AND gate 632 and terminal $X_0$ are also in a 1 state. Terminal $X_0$ is connected to a first input of each of AND gates 751e through 760e and the true output of flip-flops 751 through 760 is connected to a second input of AND gates 751e through 760e. The output of each of AND gates 751e through 760e is connected to one input of the corresponding one of OR gates 851f through 860f whose output is connected to the corresponding one of terminals 851g through 860g. Output terminals 851g through 860g are connected to the memory data input to the processor 250. The above circuitry functions to gate the contents of the D register 750 to the processor 250 if both parity bits are good during state $T_4$.

Terminal $X_0$ is also connected to an input of OR gate 633 whose output is connected to the memory complete terminal 634. The output of OR gate 633 is also connected to an input of Stop gate 631 whereby a memory complete signal is sent to the processor 250 and the counter 610 is initialized to state $T_0$ thereby inhibiting further counting.

A first input of each of AND gates 635 and 636 is connected to the output of AND gates 695 and 694 respectively and a second input of each of AND gates 635 and 636 is connected to terminal $T_4$. The outputs of AND gates 635 and 636 are connected to inputs of OR gate 637. The output of OR gates 637 is connected to terminal $X_1$ which is a 1 only if one parity bit is good and one parity bit is bad during state $T_4$. Terminal $X_1$ is connected to an input of OR gate 761 whose output is connected to a first input of each of AND gates 751h through 760h. The complement output of flip-flops 751 through 760 are connected to the second inputs of corresponding AND gates 751h through 760h. The outputs of AND gates 751h through 760h are connected to corresponding inputs of OR gates 851i through 860i. The outputs of OR gates 851i through 860i are connected to corresponding write data terminals 851j through 860j. Output terminals 851j through 860j are connected to the corresponding write data input terminals of the memory 280. The above circuitry functions to gate the complemented contents of the D register 750 to memory 280 if one and only one parity bit of the D register 750 is bad during state $T_4$.

Terminal $X_1$ is also connected to an input of OR gate 813 thereby causing the output of OR gate 813 to be a 1 whenever terminal $X_1$ is a 1. The output of OR gate 813 is connected to write terminal 814 which is in turn connected to the write control input of the memory 280. If one and only one parity bit of the D register 650 is bad during state $T_4$ then a write control signal will be sent to the memory 280 along with the complemented contents of the D register.

The output of AND gate 693 is connected to a first input of AND gate 638. A second input of AND gate 638 is connected to terminal $T_4$ whereby the output of AND gate 638 is a 1 only if both parity bits are bad during state $T_4$. The output of AND gate 638 is connected to terminal $X_2$. Terminal $X_2$ is connected to an input of OR gate 761 and an input of OR gate 813 whereby if both parity bits are bad during state $T_4$ the complemented contents of the D register 750 are gated to memory 280 along with a write control signal. Terminal $X_2$ is also connected to a first input of each of OR gates 611a, 612a, and 613a and the set input of flip-flop 614 whereby flip-flops 611, 612, and 613 are reset to 0 and flip-flop 614 is set to 1 if both parity bits are bad during state $T_4$. The state of counter 610 as defined by the states of flip-flops 611 through 614 is state $T_8$. When both parity bits are bad during state $T_4$ and counter 610 is forced into state $T_8$ the error correction circuit will remain in state $T_8$ after the next clock signal pulse at terminal 601, will perform the operations defined by state $T_8$ and advance to the next following states $T_9$ and $T_{10}$ upon subsequent clock signal pulses.

The next clock signal pulse at terminal 601 causes counter 610 to be incremented to state $T_5$ if the counter was not stopped or changed to $T_8$ during state $T_4$. During state $T_5$ the output of AND gate 625 is in the 1 state. The output of AND gate 625 is connected to terminal $T_5$ which is connected to an input of OR gate 710 whereby a read control signal is sent to memory 280.

The next clock signal pulse at terminal 601 causes counter 610 to be incremented to state $T_6$ thereby causing the output of AND gate 626 to be in al 1 state. The output of AND gate 626 is connected to terminal $T_6$ which is connected to an input of OR gate 712 thereby causing the data from memory 280 present on terminals 751c through 760c to be gated into corresponding flip-flops 751 through 760 of D register 750.

The next clock signal pulse at terminal 601 causes counter 610 to be incremented to state $T_7$ thereby causing the output of AND gate 627 to be in a 1 state. The output of gate 627 is connected to terminal $T_7$ which is connected to a first input of AND gates 639, 640, 641, and 645. A second input of AND gate 639 is connected to the output of AND gate 696, a second input of AND gate 640 is connected to the output of AND gate 695, a second input of AND gate 641 is connected to the output of AND gate 694, and a second input of AND gate 645 is connected to the output of AND gate 693.

If both parity bits are good during state $T_7$ then both inputs to AND gate 639 are 1s and the output of AND gate 639 is a 1. The output of AND gate 639 is connected to an input of Stop OR gate 631 and error signal terminal 643 whereby an error signal is sent to the processor 250 and the error correction circuit is stopped by putting counter 610 into state $T_0$.

If the low parity bit of D register 750 is bad and the high parity bit of D register 750 is good the output of AND gate 694 will be a 1 and if counter 610 is in state $T_7$ both inputs and the output of AND gate 641 will be 1s. The output of AND gate 641 is connected to terminal $Y_{10}$. Terminal $Y_{10}$ is connected to a first input of AND gates 851d through 855d and 856e through 860e. A second input of each of AND gates 851d through 855d is connected to the corresponding one of complement outputs D0 through D4 of D register 750. A second input of each of AND gates 856e through 860e is connected to a corresponding true output of S register 850, flip-flops 856 through 860. The outputs of AND gates 851d through 855d and 856e through 860e are each connected to an input of the corresponding one of OR gates 851f through 860f as well as an input of the corresponding one of OR gates 851i through 860i. The above-mentioned circuitry functions to combine the complement of the low order half of D register 750 with the high order half of S register 850 and to send the resultant data word to the processor 250 and also back to the memory 280 to be written into the currently addressed memory location.

If the high parity bit of D register 750 is bad and the low parity bit of D register 750 is good the output of AND gate 695 will be a 1 and if counter 610 is in state $T_7$ both inputs and the output of AND gate 640 will be 1s. The output of AND gate 640 is connected to terminal $Y_{01}$ which is connected to a first input of AND gates 851e through 855e and 856d through 860d. A second input of each of AND gates 851e through 855e is connected to a corresponding true output of S register 850, flip-flops 851 through 855. A second input of each of AND gates 856d through 860d is connected to a corresponding one of complement outputs D5 through D9 of D register 750. The outputs of AND gates 851e through 855e and 856d through 860d are each connected to an input of the corresponding one of OR gates 851i through 860i as well as an input of the corresponding one of OR gates 851f through 860f. The above-mentioned circuitry functions to combine the complement of the high order half of D register 750 with the low order half of S register 850 and to send the resultant data word to the processor 250 and also back to the memory 280 to be written into the currently addressed memory location.

The output of AND gate 640 is connected to a first input and the output of AND gate 641 is connected to a second input of OR gate 644. The output of OR gate 644 is connected to an input of memory complete OR gate 633 and an input of write control signal OR gate 813 whereby the combined corrected data word is written into memory 280 the combined corrected data word is sent to the processor 250 along with a memory complete signal and the error correction circuit is stopped by placing counter 610 into state $T_0$.

If both parity bits are bad during state $T_7$ then both inputs to AND gate 645 are 1s and the output of AND gate 645 is a 1. The output of AND gate 645 is connected to terminal $Y_2$ which is connected to a first input of OR gate 762. The output of OR gate 762 is connected to a first input of each of AND gates 751k through 760k and a second input of each of AND gates 751k through 760k is connected to the corresponding complementary output of flip-flops 751 through 760. Each of the outputs of AND gates 751k through 760k are connected to an input of the corresponding one of OR gates 851f through 860f. This circuitry functions to gate the complemented contents of D register 750 to the processor 250.

Terminal $Y_2$ is also connected to an input of OR gate 763 and the output of OR gate 763 is connected to a first input of each of AND gates 751m through 760m. A second input of each of AND gates 751m through 760m is connected to the corresponding true output of flip-flops 751 through 760. The outputs of AND gates 751m through 760m are connected to inputs of corresponding OR gates 851i through 860i. This circuitry functions to gate the contents of D register 750 to the memory 280.

Terminal $Y_2$ is connected to an input of OR gate 633 whereby a memory complete signal is sent to the processor 250 and the counter 610 is put in state $T_0$. Terminal $Y_2$ is connected to an input of OR gate 813 whereby a write control signal is sent to the memory 280.

All possible parity bit combinations result in the error correction circuit being stopped after state $T_7$. State $T_8$ is entered from state $T_4$ if both parity bits are bad during that state as previously discussed. During state $T_8$ the output of AND gate 628 is in the 1 state. The output of AND gate 628 is connected to terminal $T_8$ which is connected to an input of OR gate 710 whereby a read control signal is sent to the memory 280.

The next clock signal pulse at terminal 601 causes counter 610 to be incremented to state $T_9$ thereby causing the output of AND gate 629 to be in a 1 state. The output of AND gate 629 is connected to terminal $T_9$ which is connected to an input of OR gate 712 thereby causing the data from memory 280 present on terminals 751c through 760c to be gated into corresponding flip-flops 751 through 760 of D register 750.

The next clock signal pulse at terminal 601 causes couner 610 to be incremented to state $T_{10}$ thereby causing the output of AND gate 630 to be in a 1 state. The output of AND gate 630 is connected to terminal $T_{10}$ which is connected to a first input of AND gates 646, 647, 648, and 649. A second input of AND gate 646 is connected to the output of AND gate 696, a second input of AND gate 647 is connected to the output of AND gate 695, a second input of AND gate 648 is connected to the output of AND gate 694, and a second input of AND gate 649 is connected to the output of AND gate 693.

If neither or only one parity bit is bad during state $T_{10}$ then one of the AND gates 646 through 648 has both inputs and its output in the 1 state. The outputs of AND gates 646, 647, and 648 are each connected to an input of OR gate 652. The output of OR gate 652 is connected to terminal $Z_0$ which will therefore be in a 1 state if neither or only one parity bit is bad during state $T_{10}$. Terminal $Z_0$ is connected to a first input of each of AND gates 851m through 860m and 851n through 860n. A second input of each of AND gates 851m through 860m is connected to the complement output of the corresponding one of flip-flops 851 through 860. A second input of each of AND gates 851n through 860n is connected to the true output of the corresponding one of flip-flops 851 through 860. The output of each of AND gates 851m through 860m is connected to an input of the corresponding one of OR gates 851f through 860f whereby the complement of the contents of S register 850 are gated to the process 250. Each of the outputs of AND gates 851n through 860n is connected to an input of a corresponding one of OR gates 851i through 860i whereby the contents of S register 850 are gated to the memory 280. Terminal $Z_0$ is also connected to an input of OR gate 813 whereby a write control signal is sent to the memory 280. Terminal $T_{10}$ is connected to an input of OR gate 333 whereby a memory complete signal is sent to the processor 250 and the error correction circuit is stopped by putting counter 610 into state $T_0$ after all of the operations associated with $T_{10}$ are performed.

If both parity bits are bad during state $T_{10}$ then both inputs to AND gate 649 are in a 1 state and the output of AND gate 649 which is connected to terminal $Z_2$ is also in a 1 state. Terminal $Z_2$ is connected to an input of OR gate 761 whereby the complemented contents of D register 750 are gated to memory 280. Terminal $Z_2$ is also connected to an input of OR gate 762 whereby the complemented contents of D register 750 are gated to the processor 250. Terminal $Z_2$ is connected to an input of OR gate 813 whereby a write control signal is sent to memory 280. As previously described terminal $T_{10}$ is connected to an input of OR gate 633 whereby a memory complete signal is sent to the processor 250 and the error correction circuit is stopped by placing counter 610 in state $T_0$.

This completes the discussion of the operation of the double error correction circuit during a read operation since all possible state transitions have been followed to the point where the double error correction circuit is stopped and therefore prepared for the next read or write operation.

C. WRITE OPERATION

A write operation initiated by the processor 250 will now be described. No error correction functions are performed during a write operation, however, the write operation is described here in order to complete the description of the double error correction circuit.

Again, assume that counter 610 is in state $T_0$ and a 1 signal is received on the start memory terminal from the processor 250. The next clock signal pulse at terminal 601 causes counter 610 to be incremented to state $T_1$ thereby causing a 1 signal to appear at terminal $T_1$. During state $T_1$ the signal present on read/write terminal 651 is gated with R/W flip-flop 650 and the 8-bit address present on address input terminals 771b through 778b is gated into address register 770. Since this is a write operation the signal present on read-write signal terminal 651 will be a 1 thereby setting R/W flip-flop 650.

Terminal $T_1$ is also connected to a first input of AND gates 751n through 760n and 751p through 760p. The true output of R/W flip-flop 650 is connected to a second input of AND gates 751n through 760n and 751p through 760p. The data to be written into memory 280 is provided by the processor 250 on terminals 751q through 760q, which terminals are connected to corresponding third inputs of gates 751p through 760p. Inverter gates 751r through 760r each comprise an input connected to corresponding write data input terminals 751q through 760q and an output connected to an input of corresponding AND gates 751n through 760n. The outputs of AND gates 751n through 760n are connected to corresponding reset inputs of flip-flops 751 through 760 and the outputs of AND gates 751p through 760p are connected to corresponding set inputs of flip-flops 751 through 760. The above circuitry functions to gate write data from the processor 250 to D register 750 during state $T_1$ of a write operation.

The next clock signal pulse at terminal 601 causes counter 610 to be incremented to state $T_2$ thereby causing a 1 signal to be present at terminal $T_2$ which is connected to an input of AND gate 653. The true output of R/W flip-flop 650 is connected to a second input of AND gate 653 whereby the output of AND gate 653 is a 1 during state $T_2$ of a write operation. The output of AND gate 653 is connected to terminal $X_3$ which is connected to an input of OR gate 763 whereby the contents of the D register 750 are gated to the memory write data terminals 851j through 860j. Terminal $X_3$ is also connected to an input of OR gate 813 whereby a write control signal is generated at the memory write terminal 814 during state $T_2$ of a write operation. Terminal $X_3$ is also connected to an input of OR gate 633 whereby a memory complete signal is sent to the processor 250 over memory complete terminal 634 and a stop signal is sent to counter 610 by means of Stop gate 631 thereby terminating the write operation.

D. STATE TABLE

The following table summarizes the states and operations performed during each state for both a read and a write operation of the Double Error Correction Circuit shown in FIGS. 6, 7, and 8.

| STATE | READ (DOUBLE ERROR CORRECTION) DESCRIPTION |
|---|---|
| $T_0$ | Stop. |
| $T_1$ | Load address register 770. |
| $T_2$ | Start read by sending a read control signal to memory 280 on terminal 815. |
| $T_3$ | Receive data from memory 280 and put in D register 750 and S register 850. |
| $T_4$ | If neither parity bit is bad gate the D register 750 to the processor 250 on terminals 851g through 860g, gate a memory complete signal to the processor 250 on terminals 634 and stop. If one parity bit is bad write the complemented contents of the D register 750 into memory 280. If both parity bits are bad write the complemented contents of the D register 750 into memory 280 and go to $T_8$. |
| $T_5$ | Start read by sending a read control signal to memory 280 on terminals 815. |
| $T_6$ | Receive data from memory 280 and put in D register 750. |
| $T_7$ | If neither parity bit is bad send an error signal to the processor 250 on terminal 643 and stop. If one parity bit is bad generate a correct word by combining the complemented portion of the D register 750 corresponding to the bad parity bit with the other portion of the S register 850. Write the correct data word into memory 280, gate the correct word to the processor 250 on terminals 851g through 860g, gate the memory complete signal to the processor 250 on terminal 634 and stop. If both parity bits are bad write the contents of the D register 750 into memory 280, gate the complemented contents of the D register 750 to the processor 250 on terminals 851g through 860g, gate the memory complete signal to the processor 250 on terminal 634 and stop. |
| $T_8$ | Start read by sending a read control signal to memory 280 on terminal 815. |
| $T_9$ | Receive data from memory 280 and put in D register 750. |
| $T_{10}$ | If neither or only one parity bit is bad write the contents of the S register 850 into memory 280, gate the complemented contents of the S register 850 to the processor 250 on terminals 851g through 860g, gate the memory complete signal to the processor 250 on terminal 634 and stop. If both parity bits are bad, write the complemented contents of the D register 750 into memory 280, gate the complemented contents of the D register 750 to the processor 250 on terminals 851g through 860g, gate the memory complete signal to the processor 250 on terminal 634 and stop. |

-continued

READ (DOUBLE ERROR CORRECTION)

| STATE | DESCRIPTION |
|---|---|
| | WRITE |
| T₀ | Stop. |
| T₁ | Load the address register 770 with the memory address and the D register 750 with the data to be written. |
| T₂ | Start write by sending a write control signal to the memory 280 on terminal 814 and write data to the memory 280 on terminals 851j through 860j and stop. |

IV. PRACTICE OF THE METHODS BY DIFFERENT APPARATUS

What has been described is only a specific illustrative embodiment of the invention and various other arrangements may be devised by one skilled in the art without departing from the spirit and scope of the invention as defined by the accompanying claims.

For example, where memory control is performed by a processor 250 and where the processor 250 has its own memory independent of the main memory which it is controlling, the functions of the herein described circuit can be performed by such a processor 250.

What is claimed is:

1. A method for correcting errors in a memory comprising one or more words and applying the corrected words to a destination circuit where each data word in said memory comprises:

a plurality of data bits and a plurality of parity bits; and said method is practiced in an error correcting circuit comprising:

read and write circuitry for said memory;
parity check means;
complementing means; and
output circuitry for transmitting corrected words to a destination circuit;

said method comprising the following steps:

a. reading the contents of a selected word location from said memory and applying said contents to said parity check means, b. complementing said contents of said memory, applying said complemented contents of said destination circuit and stopping if the output of said parity check means indicates that all of said plurality of parity bits are bad, c. performing the following steps if the output of said parity check means indicates that at least one but not all of said plurality of parity bits are bad:

1. complementing said contents,
2. writing said complemented contents into said selected word location of said memory,
3. repeating steps a) through b).

2. A method for correcting errors in a memory comprising one or more words and applying the corrected words to a destination circuit where each data word in said memory comprises:

a plurality of data bits and a plurality of parity bits; and said method is practiced in an error correcting circuit comprising:

read and write circuitry for said memory;
parity check means;
complementing means; and
output circuitry for transmitting corrected words to a destination circuit;

said method comprising the following steps:

a. reading the contents of a selected word location from said memory a first time and applying said contents to said parity check means, b. complementing said first read contents of said memory, applying said complemented first read contents to said destination circuit and stopping if the output of said parity check means indicates that all of said plurality of parity bits are bad, c. performing the following steps if the output of said parity check means indicates that at least one but not all of said plurality of parity bits are bad:

1. complementing said first read contents,
2. writing said complemented first read contents into said selected word location of said memory,
3. reading the contents of said selected word location of said memory a second time and applying said second read contents to said parity check means,
4. complementing said second read contents and applying said complemented second read contents to said destination circuit if the output of said parity check means indicates that all of said plurality of parity bits are bad.

3. A method for correcting errors in a memory comprising one or more words and applying the corrected words to a destination circuit according to claim 2 wherein the method is practiced in an error correcting circuit further comprising an error signal means for transmitting an error signal to said destination circuit and said method further comprises the following step performed following step 3 and before step 4:

3a. causing said error signal means to generate an error signal if the output of said parity check circuit indicates that one or more of said parity bits are good.

4. The method for correcting errors in a memory and applying the corrected words to a destination circuit according to claim 2 further comprising the following step performed following step 3 and before step 4:

3a. writing said second read contents into said selected word location if the output of said parity check means indicates that all of said plurality of parity check bits are bad.

5. The method of correcting data words obtained from a memory where each data word comprises a plurality of data bits and a plurality of parity bits; the method practiced in an error correction circuit arrangement which comprises: means for writing information into the memory, means for reading information from the memory, means for evaluating the plausibility of the data words obtained from memory and for generating signals indicating failure of at least one parity bit and for indicating failure of all parity bits, means for complementing data words, means for transmitting corrected data words to a destination circuit and means for controlling the operation of said error correction circuit arrangement in response to output signals of said evaluating means; the method comprising the steps of:

1. reading a data word from a location in said memory;
2. checking plausibility of the data word obtained from memory; and
3. controlling the error correction circuit arrangement as follows:

a. if at least one but not all parity bits fail, complementing the data word and writing the resulting complemented data word back into said location in memory, and repeating steps 1-3; and b. if all parity bits fail, complementing the data word and transmitting the resulting data word to said destination circuit.

6. In a memory having a plurality of word locations for storing words therein having a plurality of parity bits, read and write circuitry for said memory, output circuitry for words read from said memory, a parity check circuit, complementing circuitry, and an error signal circuit, a method for correcting failures in said memory and applying corrected words to said output circuitry comprising the steps of:

a. applying the contents of a selected word location in said memory to said parity check circuit, b. applying the contents of said selected word location to said complementing circuitry, c. applying the complemented word from said complementing circuitry to said output circuitry and stopping if all of said plurality of parity bits from step (a) are not correct, d. causing said writing means to write said complemented word into said selected word location if at least one but not all of said plurality of parity bits from step (a) are not correct, e. applying the contents of said selected word location to said parity checking circuit, f. applying the contents of said selected word location to said complementing circuitry, and g. applying said complemented word to said output circuitry if all of said plurality of parity bits from step (e) are not correct.

7. A method for correcting errors in a memory comprising one or more words and applying the corrected words to a destination circuit where each data word in said memory comprises:

a plurality of data bits and a plurality of parity bits, each parity bit associated with certain ones of said plurality of data bits; and said method is practiced in an error correcting circuit comprising:
read and write circuitry for said memory;
parity check means;
complementing means; and
output circuitry for transmitting corrected words to a destination circuit;

said method comprising the following steps:

a. reading the contents of a selected word location from said memory a first time and applying said contents to said parity check means, b. performing the following steps if the output of said parity check means indicates that at least one but not all of said plurality of parity bits are bad:
  1. complementing said first read contents,
  2. writing said complemented first read contents into said selected word location of said memory,
  3. reading the contents of said selected word location from said memory a second time and applying said second read contents to said parity check means,
  4. combining the complement of the data bits from said first read contents associated with each bad parity bit of said second read contents with the data bits of said second read contents associated with the good parity bits of said second read contents and stopping if at least one but not all of said plurality of parity bits of said second read contents are bad,
  5. complementing said second read contents, applying said complemented second read contents to said destination circuit and stopping if all of said parity bits of said second read contents are bad, c. performing the following steps if the output of said parity check means indicates that all of said plurality of parity bits are bad:
  1. complementing said first read contents,
  2. writing said complemented first read contents into said selected word location of said memory,
  3. reading the contents of said selected word location from said memory a second time and applying said second read contents to said parity check means,
  4. writing said first read contents into said selected word location, applying said complemented first read contents to said destination circuit and stopping if one or more of said plurality of parity bits are good,
  5. complementing said second read contents, writing said complemented second read contents into said selected word location and applying said complemented second read contents to said destination circuit if all of said plurality of parity bits are bad.

8. A method for correcting errors in a memory comprising one or more words and applying the corrected words to a destination circuit according to claim 7 wherein the method is practiced in an error correcting circuit further comprising an error signal means for transmitting an error signal to said destination circuit and said method further comprises the following step performed following step (c3) and before step (c4):

(c3a) causing said error signal means to generate an error signal and stopping if the output of said parity check circuit indicates that all of said parity bits are good.

9. A method for correcting errors in a memory comprising one or more words and applying the corrected words to a destination circuit according to claim 7 further comprising the following step performed following step (c4) and before step (c5):

(c4a) writing said second read contents into said selected word location if the output of said parity check means indicates that all of said plurality of parity check bits are bad.

10. An error correcting circuit having a plurality of operating states for checking and for correcting errors in information read from a memory and for gating the correct information to a destination circuit arranged to provide start memory signals for initiating a memory read or a memory write operation, the error correcting circuit comprising:

a state counter for generating signals defining the current operating state of said error correcting circuit;

a data register comprising
  means for storing a plurality of data bits and a plurality of parity bits;
  parity check circuitry connected to said data register for generating signals indicative of parity errors in the contents of said data register;

input gating means connected to said memory, said destination circuit, and said data register for gating information into said data register selectively from said destination circuit and said memory; and output gating means connected to said memory, said destination circuit, and said data register for getting information from said data register selectively to said memory and to said destination circuit, said output gating means including means for selectively complementing the contents of said data register;

controlling means connected to said counter, said parity check circuitry, said input gating means, said output gating means, said memory, and said destination circuit and responsive to the outputs of said counter, said parity error signals, and said start memory signals for generating signals for controlling said input gating means, said output gating means, said counter, and said memory such that: a memory location is read and the information contained therein is gated to said data register; if said parity error signals indicate that at least one but not all of said parity bits contained in said data register is bad, the contents of said data register are complemented and written into said memory location, said memory location is again read and the information contained therein is gated to said data register; if said parity error signals indicate that all of said parity bits contained in said data register are then bad the contents of said data register are complemented and gated to said destination circuit; and that if said parity error signals indicate that all of said parity bits contained in said data register after the initial read of a location of said memory are bad, the contents of said data register are complemented and gated to said destination circuit.

11. An error correcting circuit in accordance with claim 10 wherein said controlling means further comprises:
an error signal output connected to said destination circuit; and
means responsive to output signals of said counter and said parity error signals for generating an error signal on said error signal output if one or more of said plurality of parity bits are good after said memory location is again read.

12. An error correcting circuit having a plurality of operating states for checking and for correcting errors in information read from a memory and for gating the correct information to a destination circuit arranged to provide start memory signals for initiating a memory read or memory write operation, the error correcting circuit comprising:
a state counter for generating signals defining the current operating state of said error correcting circuit;
a first data register and a second data register each comprising means for storing a plurality of data bits and a plurality of parity bits;
parity check circuitry connected to said first data register for generating signals indicative of parity errors in the contents of said first data register;
input gating means connected to said memory, said destination circuit, said first data register and said second data register for gating information into said first and second data registers selectively from said destination circuit and said memory;

output gating means connected to said memory, said destination circuit, said first data register and said second data register for gating information from said first and second data registers selectively to said memory and to said destination circuit, said output gating means including means for selectively complementing the contents of said first and second data registers; and controlling means connected to said counter, said parity check circuitry, said input gating means, said output gating means, said memory, and said destination circuit and responsive to the outputs of said counter, said parity error signals, and said start memory signals for generating signals for controlling said input gating means, said output gating means, said counter, and said memory such that: a memory location is read and the information contained therein is gated into said first data register and said second data register; if said parity error signals indicate that at least one but not all of said parity bits contained in said first data register is bad, the contents of said first data register are complemented and written into said memory location, said memory location is again read and the information therein is gated to said first data register; if said parity error signals indicate that all of said parity bits contained in said first data register are then bad, the contents of said first data register are written into said memory location and complemented and gated to said destination circuit; if less than all of said parity bits contained in said first data register are then bad, the contents of said first data register which corresponds to bad parity bits for information in said first data register are complemented and gated to said destination circuit and written into said memory location and the contents of said second data register which correspond to good parity bits for information in said second data register due to the initial read are gated to said destination circuit and written into said memory; and that if said parity error signals indicate that all of said data bits contained in said first data register after the initial read of a location of said memory are bad, the contents of said first data register are complemented and written into said memory location, said memory location is again read and the information therein is gated to said first data register; if said parity error signals indicate that all of said parity bits contained in said first data register are then bad, the contents of said first data register are written into said memory location and complemented and gated to said destination circuit; if said parity error signals indicate that less than all of said parity bits contained in said first data register are then bad, the contents of said second data register are written into said memory location and the contents of said second data register are complemented and gated to said destination circuit.

13. An error correcting circuit in accordance with claim 12 wherein said controlling means further comprises:
an error signal output connected to said destination circuit; and
means responsive to output signals of said counter and said parity error signals for generating an error signal on said error signal output if at least one but not all of said parity bits in said first data register after said initial read is bad and all of said parity bits are good after said memory location is again read.

* * * * *